Feb. 3, 1970  F. J. TENCZA  3,493,098
FLEXIBLE SUPPORT DEVICE FOR CONVEYOR BELTS
Filed Jan. 9, 1968  2 Sheets-Sheet 2
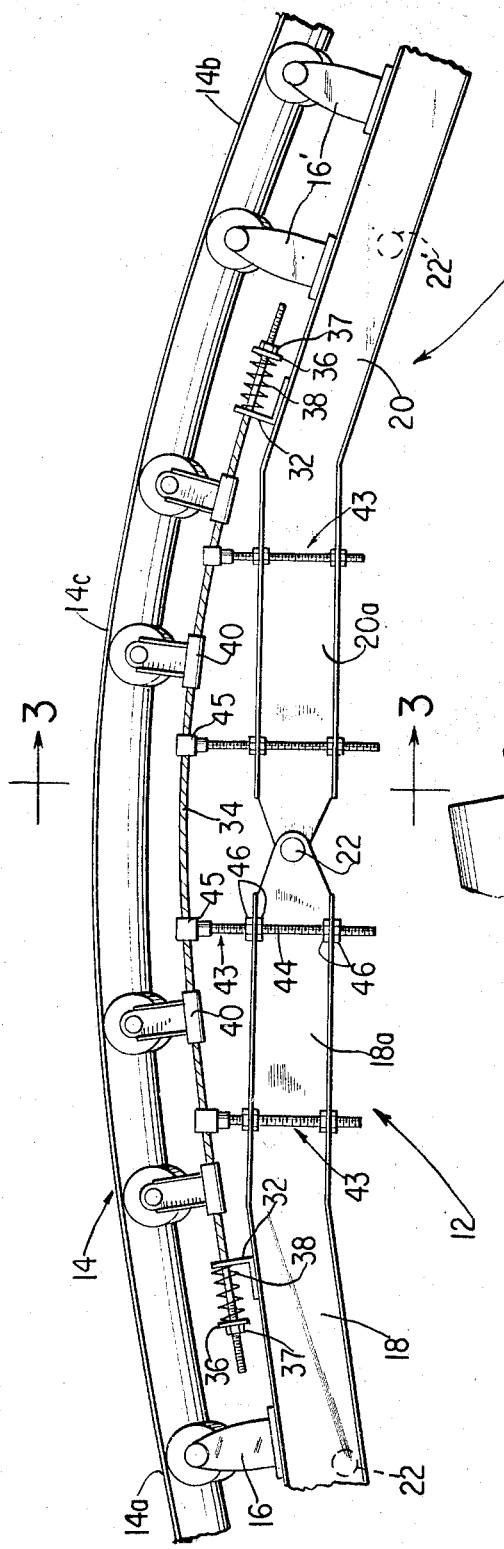
INVENTOR
FRANK J. TENCZA
BY John D. Boos
ATTORNEY United States Patent Office 3,493,098
Patented Feb. 3, 1970

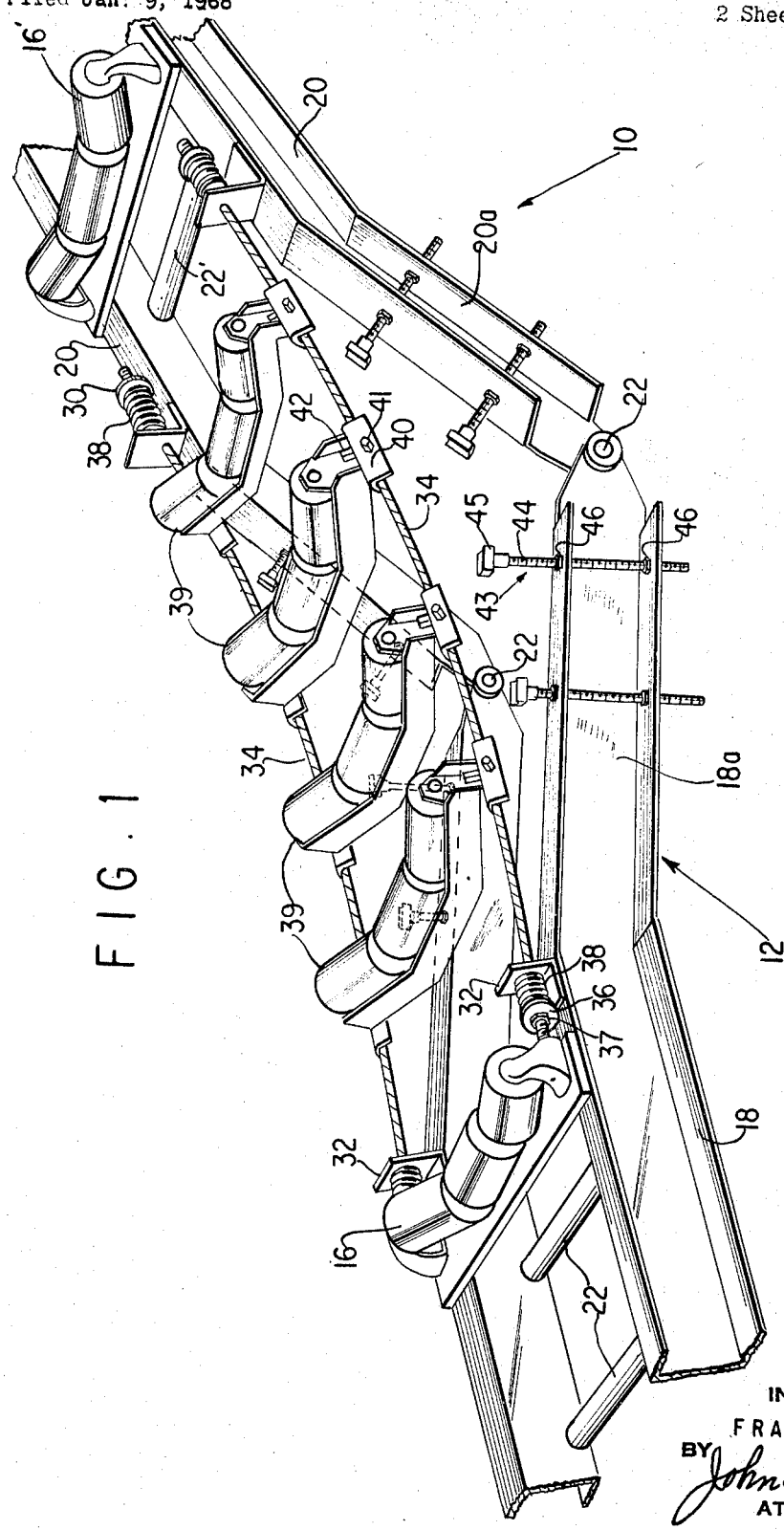

3,493,098
FLEXIBLE SUPPORT DEVICE FOR CONVEYOR BELTS
Frank J. Tencza, Wayne, N.J., assignor to Hewitt-Robins Incorporated, Stamford, Conn., a corporation of Delaware
Filed Jan. 9, 1968, Ser. No. 696,599
Int. Cl. B65g 21/20
U.S. Cl. 198—118                          7 Claims

ABSTRACT OF THE DISCLOSURE

This invention consists of a flexible support device for supporting and guiding a belt through a change of slope having idler roll assemblies mounted between spring tensioned side cables and adapted to be formed into either an upward or downward vertical curve.

BACKGROUND OF THE INVENTION

In belt conveyors or similar equipment it is frequently necessary to support a load carrying belt as it moves through a vertical angle in either an upward or downward direction. In boom conveyors, for example, a boom section is pivoted about an axis transverse to the conveying reach of an endless conveyor belt which forms the conveying reach for both the boom and frame sections. By this means it is possible to change the slope of the conveying reach of the boom relative to the conveying reach on the frame. The problem arises of supporting the conveying reach of the belt at the location where the conveying reach changes slope or direction of travel. If the belt is improperly supported or is, in fact, unsupported at this location then the belt will either tend to lose its troughed shape causing spillage of the conveyed material or will create excessive stress concentrations in the belt resulting in excessive belt wear. Thus, the problem remains of providing an idler roll support device for a conveyor belt or the like which both supports and guides the belt through a vertical curve in either an upward or a downward direction. A further problem has been to provide an idler roll support device which can be easily adjusted for guiding the belt through a various number of upward and/or downward vertical curves.

In this application the expression "upward vertical curve" is defined as meaning a curve which has the concave or inside portion of the curve opening generally upwardly and the expression "downward vertical curve" is defined as a curve that has the concave or inside portion of the curve opening generally downwardly. The term "vertical curve" is employed only to distinguish it from a curve in a horizontal plane and is not meant to be limited solely to curves in a vertical plane.

SUMMARY OF THE INVENTION

According to this invention, a flexible conveyor belt support is provided which has idler roll assemblies mounted between spring tensioned side cables that are slung between two pivoted conveyor sections. When the conveyor sections are pivoted relative to each other so as to form the side cables into an upward vertical curve, the cable mounted idler roll assemblies are positioned so as to support and guide the conveyor belt as it moves through a similar vertical curve in moving from one conveyor section to the other. Adjustable pedestals are provided on the conveyor sections when the flexible curve must support the conveyor belt moving through a downward vertical curve. These pedestals engage the side cables and form the flexible belt support into a generally downward vertical curve.

Accordingly, one object of the present invention is to provide a flexible support device for supporting and guiding conveyor belts through vertical curves.

Another object of this invention is to provide a flexible support device for use at the pivoted junction of two conveyor sections and which will support the conveying reach of conveyor belt as the belt moves from one section to the other.

A further object is to provide a flexible belt support device for use at the pivoted junction of the boom and frame sections of a boom conveyor and which device will support the conveyor belt when the boom is in either an inclined or declined position relative to frame section.

BRIEF DESCRIPTION OF THE DRAWINGS

Other objects, advantages and novel features of the present invention will become apparent in the following detailed description of the invention when considered in conjunction with the drawings wherein:

FIG. 1 is a fragmentary perspective view of a pivoted junction of a boom conveyor with the flexible support device of the present invention;

FIG. 2 is a sideview of a pivoted junction of a boom conveyor employing the flexible support device with the boom section in a declined position.

FIG. 3 is a partial detailed view taken along line 303 in FIG. 2.

DESCRIPTION OF THE PREFERRED EMBODIMENT

Referring now more particularly to the drawings, the pivoted junction of a boom conveyor is shown in FIG. 1 as consisting of a boom section 10 pivotally connected to frame section 12. A first section 14a of the conveying reach of the endless conveyor belt 14 is supported by spaced troughing idler roller assemblies 16 conventionally mounted between the side rails 18, 18 of the frame section 10 and a second section 14b is supported by similar troughing roll assemblies 16' are conventionally mounted between the side rails 20, 20 of the boom section. The return reach of belt 14 is supported by rolls 22, 22' conventionally mounted between side rails 18, 18 and 20, 20. The side rails of both sections are made, for example, from structural channel members and are formed with angled end sections or haunched ends 18a, 20a of substantially equal length and formed with substantially equal downward angles. The haunched ends of the frame section are pivotally connected at 22 to the haunched ends of the boom section such that when the boom is in the inclined position shown in FIG. 1 there is a V-shaped gap formed by each set of pivotally connected side rails. Extending across these gaps is the flexible belt support device of the instant invention which supports an intermediate section 14c of the conveying reach located between the first and second sections 14a, 14b, respectively.

Generally L-shaped brackets 32 are attached to the top of each main side rail section and are located close to the haunched ends of the side rails. Each bracket is provided with an upstanding flange having an aperture formed therein. A flexible cable 34 is slung betweeen the brackets of each set of pivotally connected side rails. The ends of each cable extend through the aperture in the upstanding portion of the brackets associated with the particular end. Washers or end caps 36 are mounted around the ends of each cable and compress helical springs 38 against the rear face of the upstanding portion of each bracket. Washers 36 can be mounted with back-up nuts 37 that are screwed on the ends of the cable and which nuts act as a means for adjusting the amount of spring compression. It will be recognized that the spring means at the end of each cable biases the ends of the cable away from each other so that the spring means tensions each flexible cable. Spaced troughing idler assemblies 39 are mounted transversely between the spaced flexible cables 34, 34 with the side brackets 40 of assemblies being connected to the cables by L-shaped clamping bolts 41 and nuts 42, as shown in FIG. 3.

Mounted to and extending upwardly from the haunched end sections are spaced pedestals 43. Each pedestal consists of a threaded shaft 44 with a pedestal head 45 formed at one end. Each shaft extends through axial aligned holes in the flanges of the side rails and nuts 46 clamp the shafts to the flanges. The height of the pedestal heads above the haunched ends can be adjusted by changing the relative position of the nuts on the shaft. As shown in FIG. 3, the supporting surface of the cradle heads are curved so as to be swung into contact with slightly more than one quarter of the circumference of the side cables.

The height of the pedestal heads above the top flange of the side rails is adjusted by use of nuts 46 so that when the boom is pivoted into a declined position side cables are formed into a curve, as shown in FIG. 3, by having the pedestal heads come into contact with and support the side cables. In this position the idler assemblies mounted between the spaced side cables are positioned such that the rolls of the idler assemblies support the conveyor belt as it moves through a downward vertical curve from the troughing idler assemblies on the frame section of the troughing idler assemblies on the declined boom.

In operation, the spring construction at each end of the side cables provides an effective resilient mounting means maintaining the side cables under tension at all times regardless whether the boom is in an inclined or declined position relative to the frame section. When the boom is in an inclined position and the belt is unloaded, the spring means will maintain the side cables in substantially straight lines between the brackets 32. If a loaded section of the conveyor belt passes over the cable mounted idler assemblies when the boom is in an inclined position the length of the side cables slung between the brackets is increased by the effect of the load compressing the end springs and allowing sections of each cable end to be pulled through the apertures in the mounting brackets. The resulting increase in cable length causes the side cables to be slung in a vertical curve between the mounting brackets. The conveyor belt moving over the idler assemblies connected between the cables will be moved through a similar vertical curve. When the boom is in a declined position the side cables are supported at intervals by the pedestals. These pedestals are positioned so that side cables are formed into a downward vertical curve and the end spring means act to maintain the side cables taut.

From the above description it will be apparent that a flexible curve support means has been provided which will support a belt as it moves through vertical curves and which permits the support means to be adjusted for changes of belt direction.

In the simplest form the invention includes spaced side cables or ropes resiliently mounted and belt support means spanning the spaced side cables. The resilient mounting can be accomplished at either or both ends of the cables and may consist of any mechanical or hydraulic means. Cable support means, such as the disclosed pedestals, need only be used when the present invention is to support belts moving over a downward vertical curve. The specific description of the flexible support means in use on a boom conveyor is for illustrative purposes only and it will be obvious that the invention can be used on any conveyor or endless belt device which requires support for the belt as it changes direction of travel in a vertical plane.

Obviousy, many modifications and variations of the present invention are possibe in light of the above teachings. It is therefore to be understood that the invention may be practiced otherwise than as specifically described.

What is claimed is:

1. A flexible belt support device for supporting an intermediate section of a conveying reach for an endless conveyor belt, said conveyor belt having a conveying reach with a first section supported by a first conveyor section, a second section supported by a second conveyor section, and an intermediate section between said first and said second sections, said second conveyor section being movable relative said first conveyor section so as to alter the slope of said sectond conveying reach section relative said first conveying reach section, said device comprising:

spaced parallel side cable, means coupling each of said cables to both said first and said second conveyor sections, resilient means at the ends of said cables for tensioning said cables, idler roll assemblies mounted between and connected to said cables for supporting the intermediate section of the conveying reach and for forming the intermediate section of the conveying reach into a vertical curve when said first section is at a slope different than that of said second section.

2. A flexible belt support device described in claim 1 which is further characterized by side cable support means mounted on said conveyor sections below said side cables and positioned to support side cables when the idler roll assemblies are to support the intermediate section of the conveying reach in the form of a downward vertical curve.

3. A flexible support device as described in claim 2 wherein said side cable support means are pedestals having head sections which support said side cables.

4. A flexible belt support device in combination with a conveyor system having a first and a second conveyor section supporting the conveying reach of an endless conveyor belt, said first and said second conveyor sections being relatively movable about an axis substantially transverse to the normal path of travel of the conveying reach so as to permit the bending of an intermediate section of the conveying reach in order to thereby adjust the slope of the conveying reach supported by said first conveyor section relative to the slope of the conveying reach supported by said second conveyor section, said flexible support device supporting the intermediate section of the conveying reach of said conveyor belt and comprising:

spaced flexible support members, means coupling said flexible support members to both said first and said second conveyor sections, tension means coupled to said flexible support means for resiliently tensioning said flexible support members, and idler roll assemblies mounted between and connected to said spaced flexible support members which supports the intermediate section of the conveying reach when the conveying reach supported by said first first conveyor section is in substantially in the same plane as the conveying reach supported by second conveyor section as well as when the second conveyor section is moved relative to the first conveyor section so that the slope of the conveying reach supported by the first conveyor section is different from the slope of the conveying reach supported by the second conveyor section.

5. The combination described in claim 4 which is further characterized by support means connected to said first and said second conveyor sections, said support means coming into contact with and supporting said flexible support members only when said first and said second conveyor sections are positioned relative to each other such that the conveying reach supported by said second section is in a declined position relative to the conveying reach supported by said first conveyor section, said idler roll assemblies connected to said flexible support members supporting the intermediate section of said conveying reach in the form of a downward vertical curve when said support means support said flexible support members.

6. The combination described in claim 5 wherein said support means are pedestals comprising shafts adjustably connected to said conveyor sections and pedestals heads formed at one end of said shafts, said pedestal heads being formed so as to receive and support said cables.

7. The combination described in claim 6 wherein said tensioning means are spring means coupled to the ends of said cables which resiliently tension said cables.

References Cited

UNITED STATES PATENTS 2,883,035  4/1959  Erisman.
2,987,164  6/1961  Gregg _____ 198—192

RICHARD E. AEGERTER, Primary Examiner

U.S. Cl. X.R.

198—192